Dec. 18, 1962 R. G. RUSSELL 3,068,670
APPARATUS FOR PRODUCTION OF GLASS FIBERS
Original Filed Nov. 22, 1954 2 Sheets-Sheet 1
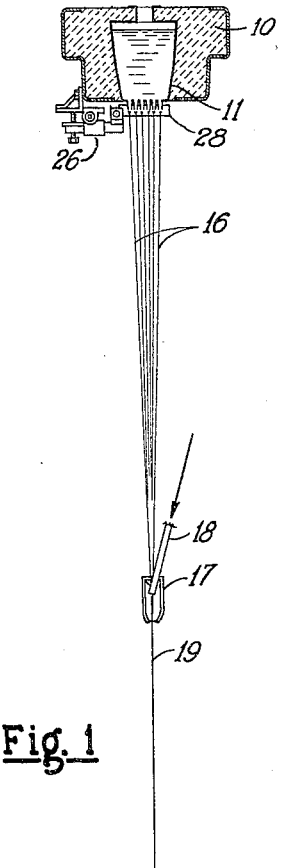
Fig. 1
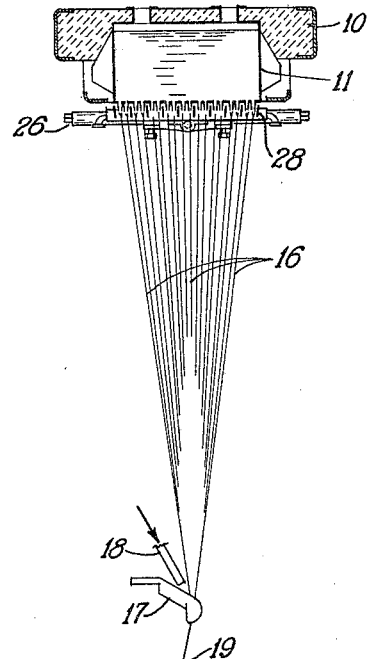
Fig. 2
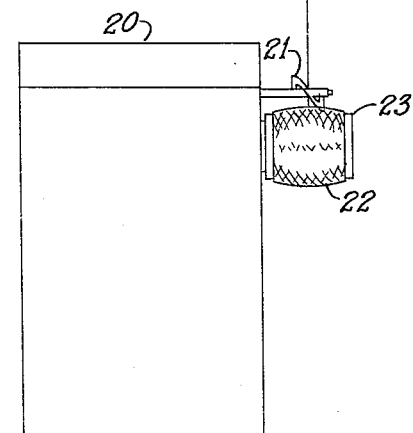
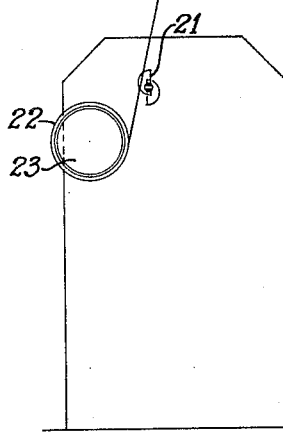
INVENTOR.
ROBERT G. RUSSELL
BY
ATTORNEYS

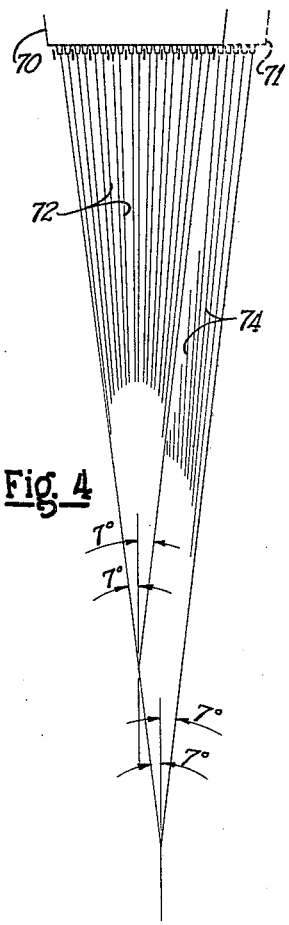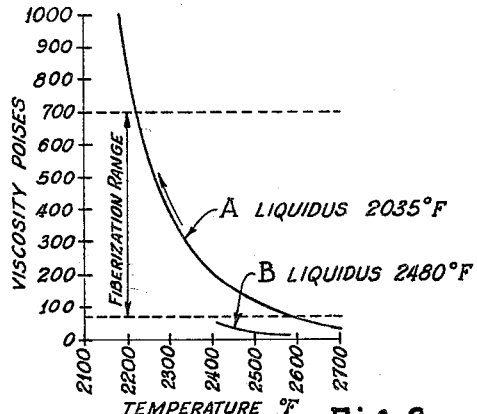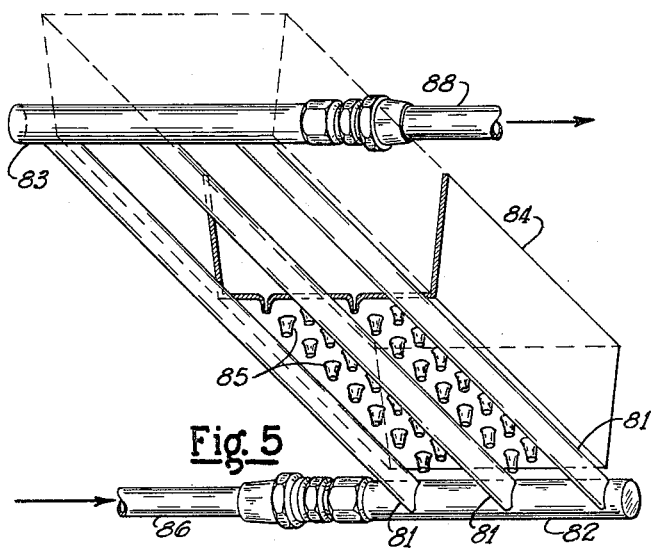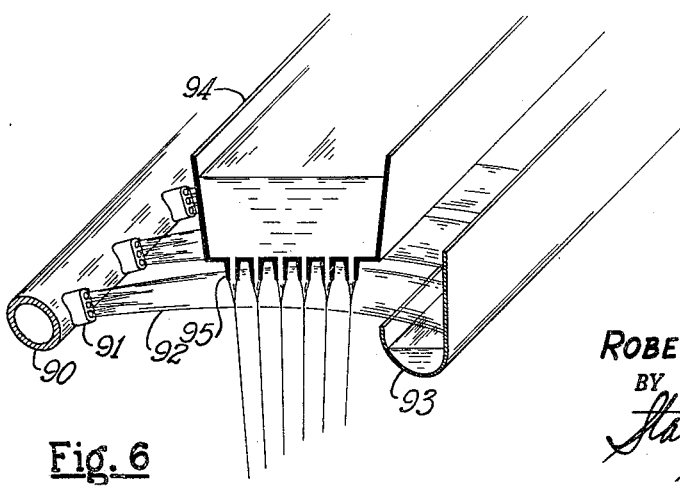

United States Patent Office 3,068,670
Patented Dec. 18, 1962

3,068,670
APPARATUS FOR PRODUCTION OF GLASS
FIBERS
Robert G. Russell, Granville, Ohio, assignor to Owens-Corning Fiberglas Corporation, a corporation of Delaware
Original application Nov. 22, 1954, Ser. No. 470,357, now Patent No. 2,908,036, dated Oct. 13, 1959. Divided and this application Oct. 13, 1959, Ser. No. 846,100
3 Claims. (Cl. 65—12)

This invention relates to improvements in the production of fibers from heat-softenable materials and particularly to apparatus for producing fibers of siliceous material such as glass or the like which simultaneously effects an increase in quality, economy and ease of handling such fibers.

This application is a division of my co-pending application, Serial No. 470,357, filed on November 22, 1954, and issued as Patent 2,908,036 on October 13, 1959.

The invention is described particularly in connection with the production of continuous glass fibers wherein streams of molten glass are attenuated mechanically into continuous fibers of small diameter which are then gathered into a strand and wound into a package. Fibers thus produced are then usually processed into other textile forms such as yarns, cords, roving, etc. on conventional textile machinery for subsequent use in ever-widening fields of application.

In greater detail, the process of producing continuous fibers of glass to which the present invention relates involves flowing streams of molten glass from orifices of an electrically heated bushing or feeder associated with a container reservoir in which the material is reduced to a molten condition. The orifices are preferably formed in projecting tips or nipples from which heat of the glass is dissipated as it flows in the form of streams therefrom, but may also be formed in the apex of a V-shaped feeder or other structural arrangements such as a flat plate feeder made of a non-wetting alloy. Upon emission to the atmosphere, the streams of glass, each neck down, as determined by their viscosity and surface tension, to form a cone-like body of the glass from the tip of which a fiber is drawn. Tests indicate that the cohesive forces which transmit the attenuation forces from the fiber to the body of the cone are closely related to the viscosity of the glass. Surface tension of the glass also contributes to the transfer of forces over the periphery of the cone, but, in addition, acts to bring about constriction of the stream into the conical configuration. Low viscosity fluids, such as glass at too high a temperature may actually be constricted into beads by the surface tension, or in other words, divided into a series of droplets instead of flowing as a continuous stream. High viscosity of fluid, on the other hand, slows the constricting forces and does so with much more pronounced effect as the diameter is diminished, thereby causing viscosity to act as a major factor determining stability in the fiber-forming zone.

Thus, it can be seen that if the viscosity of a given glass emitted from an orifice into a forming cone is too high, the tension required to be applied to the cooled fiber to effect attenuation of the cone can be so high as to result in breakage of the fiber. At the more fluid end of the viscosity range, however, emission of highly fluid glass results in a form of pumping within the cone which results in a dancing movement or instability of the cones at the feeder tips. Furthermore, if the viscosity of the glass is extremely low, surface tension acts undesirably to constrict the glass into discontinuous separate droplets. A range of viscosities therefore exists within which fiberization can be accomplished and above which and below which fibers are difficult or impossible to produce.

According to the present invention, I have made it possible to extend the viscosity range to permit fiberization of glass heated to a much higher temperature and to a much more fluid condition than has heretofore been believed possible to fiberize. This permits production of fibers of greater homogeneity and fiberization of glasses heretofore non-fiberizable while at the same time making operating conditions less critical to temperature variations as explained hereafter. It has been found, however, that in attenuating fibers from molten glass heretofore, the ranges of temperature and viscosity of the main body of glass were generally limited by the rate at which the glass in the cones could be cooled to the fiberization viscosity range. The rate of cooling was more or less uncertain in that it was subject to random conditions of the atmosphere surrounding the feeder tips. This frequently resulted erratic operation of the forming apparatus and production of fibers of less uniformity than requirements dictated.

In addition, on exposure to the atmosphere, the glass which flows from the main body of glass moves in the cones relatively slowly, but after being necked down to form fibers, the linear movement is extremely rapid and at times reaches velocities in the order of 15,000 to 20,000 feet per minute or more. With such high velocities, drafts of air are caused to move with the fiber surfaces and to create air eddies about the cones which result in highly erratic temperature conditions and consequent unpredictability both in cone stability and continuity of operation.

I have found according to the present invention, however, that the fiber-forming cones emitted from the feeder orifices can be shielded against eddies and cooled under controlled conditions to overcome such results.

It is an object of the present invention to provide an improved means for forming continuous glass fibers in a more trouble-free continuous operation than has heretofore been possible. I have discovered that instability of the cones can be overcome by providing cool shield members immediately adjacent the fiber-forming cones. Such shields act to more rapidly cool the glass emitted from the orifices and baffle, or, in a sense, isolate movement of air eddies about the feeder tips and cones. In another sense, the shield members offer an environmental-type control for the glass cones which results in cone stabilization and formation of fibers of much greater uniformity.

It is another object of the invention to provide an improved means for forming continuous glass fibers in which the resulting fibers are of a much higher quality in that they are much more uniform in fiber diameter and yardage per pound as well as in internal structural constitution. An important factor influencing and promoting such uniformity in the fibers by the present invention is the higher fluidity with which the glass may be supplied from the feeder without fear of imparting disrupting instability to the cones.

It is still another object of the present invention to provide a new means for producing glass fibers of greater strength than fibers produced heretofore. The use of a higher glass temperature, and consequently a more fluid glass in the forming cones, imparts a smoother or more perfect surface to the fibers which has been found to result in greater tensile strength. Strength is further promoted by the fact that the glass can be maintained well above its liquidus temperature reducing the possibility of devitrification or fixing of undesired crystal phases of the glass during formation of the fiber. When glass is heated to higher temperatures according to the present invention, tendencies toward devitrification and passage through the feeder orifices of seeds, bubbles, viscous steaks, or cords which may arise are thus substantially eliminated, thereby additionally assuring a more constant continuous forming operation and greater strength in the finished fibers due to greater uniformity of the glass structure.

It is a further object of the present invention to provide an improved means for forming continuous glass fibers in a more trouble-free continuous operation than has heretofore been possible. With the higher temperature glass permissible within the concepts of the invention, it is possible to reduce the tension in the individual fibers and reduce the number of breaks in such fibers both at the feeder tips and at the point of gathering the fibers into a strand. Tests indicate that the number of packages which may be completed without interruption due to breaks in the fiber can be more than doubled by adoption of the present invention. In addition to an increase in continuity of operation, lower tension in the fibers results in less breakage of fibers as the strand is wound directly on the package and consequently less fuzz is experienced in the finished package. The package is made more handleable thereby, but is also made more handleable because of less internal stress in the package due to lower tension of the strand as it is wound in the package, thus facilitating a more free runout of the strand during unwinding for subsequent operations such as further processing in textile machines.

Another and still further object of the present invention is to make possible the fiberization of glass compositions heretofore impossible to fiberize. In many instances the properties of the glass are such that the glass has a high liquidus temperature or a steep slope in its viscosity-temperature characteristic above the liquidus temperature which has made it very difficult or impossible to fiberize because of the critical relationships which must be maintained in the main body of glass to establish fiberization viscosity conditions. By the use of cone shields, according to the present invention, however, such fiberization is made possible by environmental control of the forming zone. Control in this way permits a rapid lowering of the viscosity of highly fluid glass emitted from the orifices to the viscosity range within which fibers may be formed and effects cone stabilization to the extent assuring formation of fibers of uniform quality.

A feature of the invention lies in the increased job efficiency possible by use of cone shields which results because each operator may be assigned to operate more than the usual number of feeder positions.

Another feature lies in the fact that by operating the melting unit at a higher temperature, the viscosity of the glass in the melting unit is less critical to temperature changes since the viscosity-temperature curves generally level off at a higher value, whereas much of the glass used to produce the fibers was previously required to be maintained at a temperature in a range where the curve was more sharply inclined and were operating characteristics were more susceptible to modification with slight changes in temperature.

Other objects and features which I believe to be characteristic of my invention are set forth with particularity in the appended claims. My invention, however, both in organization and manner of construction together with further objects and advantages thereof may be best understood by reference to the following description taken in connection with the accompanying drawings, in which:

FIGURE 1 is a side-elevation view of a general layout of apparatus including shielding components for production of continuous glass fibers in accordance with the present invention;

FIGURE 2 is a front-elevational view of the apparatus of FIGURE 1;

FIGURE 3 illustrates representative curves of the viscosity-temperature characteristic of two glasses which may be fiberized according to the present invention;

FIGURE 4 is a composite front-elevation view of fibers attenuated from a bushing according to the present invention and in comparative dotted lines the space consuming wider and longer fan of fibers which results when shielding according to the present invention is not utilized;

FIGURE 5 illustrates a cone-shielding arrangement adapted to operation in accordance with the principles of the present invention;

FIGURE 6 is a perspective view of another cone-shielding arrangement adapted to operation in accordance with the present invention.

Referring now more particularly to the drawings, FIGURES 1 and 2 illustrate a refractory furnace 10 for reducing a body of glass to a molten condition having a bushing or feeder 11 associated therewith from which a plurality of streams of glass are emitted from orifices in the feeder tips for attentuation into fibers 16. The fibers are drawn to a gathering member 17 at which they are gathered and at which sizing fluid is also applied to the fibers as it is supplied from a tube 18 connected to a reservoir not shown. The strand 19 formed of the gathered fibers is packaged by a winder 20 which collects the strand on a tube 22 mounted on a rotating collet 23 and traversed by a suitable traversing device such as a spiral wire traverse 21. The winder provides the force of attenuation for the fibers by reason of rotation of the collet which develops tension in each fiber to withdraw it from the molten glass flowing from the feeder.

A cone shielding unit 26 provides a plurality of metal shield members in the form of blade-like fins 28 each extending across the width of the feeder between a pair of rows of feeder tips 14, while each adjacent pair of such members has two rows of tips aligned therebetween. The fins 28 extend from a longitudinal hollow cooled manifold or header bar 29 disposed laterally with respect to the feeder structure. Cool water or other coolant is supplied and removed from the header by suitable means such as hoses or conduits 27. Water is fed to one end of the header bar and flows through a hollow channel 25 passing longitudinally through the bar and is emitted from the opposite outlet end at a somewhat higher temperature since upon passage through the header, heat is absorbed from the fins. The water can be passed through the channel 25 at a controlled rate of flow and at temperatures predetermined to establish desired temperature differentials between the fins and the glass emitted from the feeder tips.

This invention permits feeders such as feeder 11 to have a larger number of rows of tips which lends to more efficient utilization of operating space as well as efficiency is use and fabrication of the precious metals of which such feeder structures are usually made. In the past, however, operating experience without the use of cone shields has indicated that although feeders with one or two lengthwise rows of tips operated satisfactorily, feeders with three or more rows of tips could not be operated without some difficulty and more than four were practically impossible to operate satisfactorily. This situation arises apparently because the inner rows of tips and cones cannot dissipate heat as readily while the outer rows of tips and cones having access to cooler surroundings can more readily dissipate heat to effect satisfactory operation. The glass emitted from the inner rows of tips thus was more fluid and tended to flood over the feeder surface and break in continuity of flow because of less cohesiveness in the glass of lower viscosity. It will be recognized that heat dissipation from the inner rows is not readily absorbed by surrounding structural parts of the feeder because of a relative lack of temperature differential. By arranging for placement of at least one shield member directly adjacent to each cone emitted from a feeder, however, the feeder can be operated satisfactorily regardless of the existence of interior longitudinal rows of tips such as when more than two rows of tips are provided in a feeder.

Accordingly, where the feeder has more than two rows of tips, such as the six rows of the illustrated embodiment, the shields may be conveniently extended crosswise under the feeder and spaced apart with two rows of tips between each adjacent pair of shields. Fins having a thickness in the order of .02" to .06" have been found to perform satisfactorily as shields. The orifices from which the cones of glass being attenuated emerge may be in the order of .02" to .08" in diameter with a diameter of .04" being a representative size for many forming operations. The space between the crosswise rows of tips within which the fins pass may be made slightly wider than the remaining crosswise rows to more readily accommodate their thickness dimension and also provide greater tolerance for lateral positioning of the shields.

In operation the cone shields stabilize the cones from which the glass fibers are attenuated in a dual sense, namely, (1) by controlling absorption of heat from the glass on emission from the feeder tip and thereby to impart a viscosity to the glass which promotes stability thereto in its fiberization range, and (2) by reducing the disrupting erratic effects of air eddies about the cone as may be caused by both thermal differential conditions and motion of the glass.

The exact mechanics by which the glass is withdrawn at high speed from a feeder tip is exceedingly difficult to analyze from a theoretical standpoint, because the cone of hot glass is in a region of high temperature gradients and accordingly, a region where conditions are such that raipd variation of viscosity can readily occur. Thermocouple tests in the region of unshielded cones have indicated almost continuous temperature variation in the order of 300° and 400° F. within extremely short time intervals. Observations also indicate that heat losses from the cone are effected by way of radiation as well as by convection. It is believed that most of the radiation losses occur in the region immediately below the feeder tip, in other words, the base of the cone, where the glass has it a brightest glow and that as it moves down toward the apex of the cone, more and more losses occur by convection. Accordingly, when cooled cone shields are placed adjacent the cones, heat transfer thereto is by way of radiation as well as convection.

Aside from their function in absorbing heat from the glass, the cone shields also separate or isolate the cones for environmental control and prevent broad sweeping gusts of air from freely flowing about the region of the cones. Thus, erratic variations in temperature caused by such gusts or drafts are restrained, while, in addition, the eddies created by sweeping of the air past the cones are practically eliminated. Futhermore, the cumulative flow of air which may be caused by the temperature differential between forming cones is reduced by separation of the rows of cones from each other, thus also minimizing the complexity offered by their thermal interaction. Further, in this regard, the height of the shields is preferably such that they extend down to the virtual limits of the cone. It is preferred that the height of the shields be such that they extend from a slight distance above the bottom of the tips from which the cones are emitted downwardly along side of the cones to a level coinciding with the tip of the effective length of the cone. The term cone as herein used designates the shape assumed by a stream of molten glass in the zone in immediate proximity to the outlet of an orifice from which it emerges and is attenuated. In a mathematical sense the shape assumed might be more accurately termed a tractrix. The effective length of the cone as used is defined as that length of the emerging glass susceptible to controlled heat loss or the length of the stream in which heat loss from the material substantially affects the final diameter of the filament. Test observations have revealed that this length corresponds practically to the visual length of the cone terminating with a virtual apex. It is in this portion that the glass flows most freely, while the glass beyond the virtual apex of the cone where the final fiber diameter is closely approached is less suspectible to instability and to being affected by shielding.

As an example of conditions of operation when cone shields are utilized, a conventional feeder producing 450 strand—45,000 yards per pound of glass—operated satisfactorily at a flow rate of approximately ⅓ to ½ gallon of water per minute through the header at an input temperature of 70° F. The water emitted from the outlet under these conditions was at a temperature of 85° to 90° F. The average number of complete packages which could be wound per hour was more than doubled in comparison to the standard operation without cone shields. In addition, the number of breaks at the feeder was cut to ⅒ the number originally experienced while the number of breaks at the gathering point was cut by more than ½. The power input to the feeder under these conditions was increased approximately 15% over standard. From the latter figure it will be recognized that the feeder was maintained at a higher temperature than standard for feeders without cone shields and that the cone shields acted to absorb the additional heat from the cones themselves to effect control of the cone temperature and its viscosity in the fiberization range.

In fiberizing glass three characteristics of the glass should be considered because of their importance in determining operating conditions. One such factor is the slope of the curve of the viscosity-temperature characteristic of the glass in the fiberization range and above. If the slope of this curve is relatively steep, the temperature range for forming fibers is critically narrowed and difficult to establish within the short time interval within which each portion of fiber is formed. By the use of cone shields, however, this temperature range may be more definitely imparted to the glass in the forming zone since the portion of the path within which the temperature change occurs is controllably influenced by the shields.

A second factor which must be considered in effecting fiberization of glass is the liquidus temperature of the glass. If the liquidus temperature is high, then the glass must be raised in temperature to a point where its viscosity is critically near the border line or outside of the viscosity range within which fiberization can be effected. Under such conditions the cone shields can be used to cool the glass to a fiberizable viscosity on emission from the tips even though the temperature and fluidity of the glass in the main body is much beyond the fiberization range. Without cone shields, the glass on emission from the tips does not cool at a sufficient rate to permit establishment of a continuous pull from the low viscosity fluid. In other words, the surface tension of the highly fluid glass would cause a beading at the tips and possibly flood the feeder and thereby prevent continuous attenuation into a fiber.

A third important characteristic in considering fiberization of a glass is the rate of devitrification of the glass. If the rate of devitrification is high and the molten glass is cooled too slowly, the glass passes through its temperature of devitrification slowly, and may undesirably freeze in a crystalline phase. By use of cone shields, however, glasses having high rates of devitrification may be chilled more rapidly on emission from the feeder tips and can be solidified before even partial devitrification can occur.

Because by use of the present invention it is possible to raise the temperature of the main body or source of the glass and consequently lower its viscosity, glasses having a viscosity-temperature characteristic like that represented by curve A of FIGURE 3 may be made less critical to temperature variations of the feeder. The composition of the glass illustrated is as follows:

| | Percent |
|---|---|
| $SiO_2$ | 54.2 |
| $Al_2O_3$ | 14.6 |
| $CaO$ | 17.3 |
| $MgO$ | 4.6 |
| $B_2O_3$ | 8.4 |
| $Na_2O$ | 0.6 |
| $Fe_2O_3$ | 0.2 |
| $F_2$ | 0.3 |

As may be seen, curve A changes from a steep viscosity-temperature characteristic to a gradually sloping characteristic at higher temperatures within the fiberization range. Thus, when the glass is maintained at the higher temperatures, its viscosity is less critical to temperature variations such as may be experienced by extraneous electrical current variations through the feeder.

Besides reducing the critical relationship between viscosity and temperature within the main body of the glass, high temperatures also reduce tendencies toward devitrification of the molten glass which are frequently experienced when the main body is at lower temperatures. Greater homogenization and more uniform structural constitution of the glass on emission of the glass from the feeder tips is promoted by higher temperatures. When a glass such as that represented by curve B of FIGURE 3 has a high liquidus temperature, i.e., 2480° F., the viscosity of the glass when raised to such temperature may be so low as to be outside the fiberization range. The composition of this glass is as follows:

| | Percent |
|---|---|
| CaO | 29.2 |
| MgO | 3.9 |
| BaO | 5.0 |
| $Na_2O$ | 3.4 |
| $K_2O$ | 2.7 |
| $Al_2O_3$ | 44.8 |
| $SiO_2$ | 10.3 |
| $B_2O_3$ | 0.7 |

Production of continuous fiber from such glass from such glass by prior art means is practically impossible because the glass on emission from the feeder would have insufficient cohesiveness to resist its surface tension for establishment of the continuity required to form such a fiber. By means of the present invention, however, the glass may be heated to a fluid stage outside of the fiberization range and still be fiberized by reason of the more rapid cooling of the glass which can be effected by shields to cause the liquid to pass to its viscous fiberization condition more rapidly on emission from the tips. By permitting heating of the glass to be fiberized to a higher temperature according to the present invention, fiberization can also be effected with less attenuating force and correspondingly with less tension being developed in the fibers between the feeder and the collection zone. Because the total tension in the fibers is lower, the tension in the package being wound is also lower, thereby resulting in less in less breakage of fibers in the package and consequently less fuzz. The lesser tension in the finished package also results in a more free runout of the strand during unwinding of the package for subsequent use such as in automatic textile processing machines where free runout is often an economic necessity.

Still another factor associated with tension in the fibers is the shortened feeder which is made possible by means of multiple rows of tips permitted by use of cone shields. With a shorter feeder 70 instead of the standard feeder 71 illustrated in dotted lines in FIGURE 4, the length of the fan of fibers between the feeder and the gathering point may be greatly reduced without modifying the angular relationship of the outer fibers in the fan with respect to the vertical. It is well established that fibers at the extremities of the fan of fibers emitted from a feeder are subjected to the greatest tension, and that an angular relationship of about 7° with respect to the vertical is an average maximum limit which may be resorted to without presenting an operating condition in which excessive breaks will occur because of excessive tension. In the present invention, the feeder is reduced in length for a given number of orifices because of the increase in the number of rows of orifices which may now be provided across its width. The length of the bushing and consequently the width of the fan of fibers at the point of emission is correspondingly reduced. Thus, for the same maximum angular relationship of the extreme fibers with respect to the vertical, the fan of fibers 74 emitted from a standard length feeder 70, may be reduced to a smaller fan 72 shortened proportionately to the reduction in length of the feeder.

A shortened fan of fibers is of importance in that less total air is entrained by its fibers, thereby desirably reducing the total tension established in the individual fibers and strand. Continuity of the forming operation and reduction in breakage of individual fibers at the collection package are thus promoted. Furthermore, the shortened fan is of importance in reducing the amount of vertical space required for a given strand-forming operation. The complete operation can be placed within a space which an operator can readily maintain under control with less expenditure of effort.

In operating a given forming position having a feeder with 204 holes arranged in two rows of tips, a height of 30" was required to gather the 204 fibers from the feeder in order to prevent establishment of excessive tension in the outer fibers. When the same number of fibers was attenuated from a six row feeder having an associated cone shielding structure, the required length of the fan of fibers was no more than 14" with the same angular relationship in the fibers at the extremities.

FIGURE 5 illustrates a type of cone-shield unit 80 in which hollow water-cooled tube members 81 extend lengthwise under the feeder 84 between an inlet header 82 and an outlet header 83 to divide the longitudinal rows of tips 85 into pairs of rows. The tubes 81 are made of material such as copper and are flattened into a cross-sectional shape having a longer axis dimension extending parallel to the axis of the cones with which they are associated. The flattened tubes extend from a level slightly above the bottom of the tips down to a level corresponding to that to which the effective length of the cone extends. The tips of the feeder of this arrangement may be staggered, if desired, and two shield members 81 passed parallel to the outside rows of such tips while a central shield member 81 passed between the central rows of tips divides the tips into pairs of shielded rows. Water or other coolant is supplied to the inlet header 82 and removed from the outlet header 83 by way of inlet and outlet hoses 86 and 88, respectively.

FIGURE 6 illustrates another embodiment of the present invention in which shielding between crosswise rows of tips is provided for a feeder 94 by a series of narrow streams of water 92 ejected from water nozzles 91 associated with a common header 90. The streams are divided into groups of three, each group being emitted from a common nozzle 91. The nozzles 91, 91 each have three orifices from which a group of streams are emitted which merge on emission to form a ribbon-like flow of water. The ribbons of water pass between the crosswise rows of tips 95 to isolate the rows in a manner similar to the fin and the tube structures of the first two embodiments of the invention. The water is then collected in a collecting trough 93 on the opposite side of the feeder from that on which the nozzles 91 are located. The ribbons of water flowing across the rows of tips of the feeder act like solid shield members in that they prevent the flow of sweeping drafts of air across the feeder tips and cool the forming cones.

It is preferred that the shield members be passed between the rows of tips in such a manner as to protect the zone extending at least from the immediate level of the orifices to a level somewhat lower where the glass flowing into the filaments is substantially unaffected by variances in heat loss or disturbances from extraneous atmospheric drafts.

It will be understood that the shields as disclosed herein have value in the production of fibrous glass combinations other than strand products. For example, the shields may be used in the formation of glass primaries such as described in Patent 2,489,243 in which the glass is attenuated at slow speeds such as by mated rollers between which they are drawn, and then disrupted into discontinuous fibers such as by the blast of a gaseous burner flame. By reason of the use of shields, the primaries may be imparted a more uniform diameter from end to end along their individual lengths and may be made more consistently alike in diameter between each other. When such primaries are placed in alignment next to each other for passage through the burner blast or flame, the uniformity of diameters permits establishment of more uniform conditions of disruption for all primaries. The flame of the burner under such conditions then may be more critically adjusted for optimum heating and disruption conditions for the specific diameter of fibers used. Besides thus effecting a more efficient operation for disruption of the glass into discontinuous fibers, the resulting secondary fibers are correspondingly more uniform in properties.

Correspondingly it will be understood that shielding as herein disclosed can be advantageously used in the production of staple-type fibers in which attenuation is accomplished by gaseous blasts such as steam or air. In this respect shields may be incorporated in processes such as that described in Patent 2,314,857.

While I have shown certain particular embodiments of my invention, it will, of course, be understood that I do not wish to be limited thereto, since many modifications may be made, and I contemplate by the appended claims to cover all such modifications as fall within the true spirit and scope of my invention.

I claim:

1. Apparatus for producing glass filaments comprising a source of molten glass, a feeder associated with said source having projecting tips extending from an under surface thereto, said tips being aligned in rows and each having an orifice provided therein from which a stream of glass is emitted, means for attenuating the streams to fine filaments, said attenuating means acting on said streams in such a way as to impart in general a conical shape to each extending from a base at its respective orifice to an apex from which its respective filament is withdrawn, environmental control means associated with said feeder comprising longitudinal thin wall tubular members arranged in side-by-side relation and aligned so that each extends adjacent at least one row of cones emerging from said tips, said thin wall tubular members each being arranged to extend in close heat-transfer relationship with the cones adjacent which it is aligned and extending generally downward from a level of the base of the cones but not in contact with the under surface of said feeder, and cooling means controllably passing cooling fluid through said thin wall tubular members to withdraw heat directly therefrom to promote continual absorption of heat for stable thermal conditions adjacent the cones with which such members are associated.

2. Apparatus for producing filaments of thermoplastic material comprising a feeder having orifices issuing molten streams of such material, means for attenuating said streams into fine filaments, environmental control means associated with said feeder comprising means supplying jets of liquid fluid, said jet supply means having fluid ejecting orifices each dimensioned and oriented to direct a jet of said liquid fluid along a sharply defined path transverse to and in adjacent heat-transfer relationship with the path of at least one of said streams without contacting said streams.

3. Apparatus for producing filaments of thermoplastic material comprising a molten source of such material, a feeder associated with said source having orifices from each of which a molten stream of such material is emitted, said orifices being aligned in rows, means for attenuating said streams into fine filaments, said attenuating means acting on said streams in such a way as to impart in general a conical shape to each, each such cone extending from a base portion to an apex from which its respective filament is withdrawn, environmental control means associated with said feeder comprising means supplying jet streams of fluid acting as shields, said jet supply means being arranged to project jets of said fluid in clearly defined paths between rows of said cones emerging from said orifices to subdivide the total number of cones issuing from said feeder into smaller groups without contacting said cones.

References Cited in the file of this patent

UNITED STATES PATENTS

| | | |
|---|---|---|
| 1,427,014 | Von Pazsiczky | Aug. 22, 1922 |
| 2,291,289 | Slayter et al. | July 28, 1942 |
| 2,335,135 | Staelin | Nov. 23, 1943 |
| 2,634,553 | Russell | Apr. 14, 1953 |
| 2,821,744 | Spohn et al. | Feb. 4, 1958 |
| 2,908,036 | Russell | Oct. 13, 1959 |

FOREIGN PATENTS

| | | |
|---|---|---|
| 205,674 | Australia | Jan. 18, 1957 |